US007618907B2

(12) United States Patent
Tilton

(10) Patent No.: US 7,618,907 B2
(45) Date of Patent: Nov. 17, 2009

(54) LOW POROSITY FACINGS FOR ACOUSTIC APPLICATIONS

(75) Inventor: Jeffrey A. Tilton, Prospect, KY (US)

(73) Assignee: Owens Corning Intellectual Capital, LLCDE (US)

( * ) Notice: Subject to any disclaimer, the term of this patent is extended or adjusted under 35 U.S.C. 154(b) by 898 days.

(21) Appl. No.: 10/211,407

(22) Filed: Aug. 2, 2002

(65) Prior Publication Data

US 2004/0023586 A1 Feb. 5, 2004

(51) Int. Cl.

*B32B 5/26* (2006.01)
*D04H 1/56* (2006.01)
*D04H 1/54* (2006.01)
*D04H 5/06* (2006.01)

(52) U.S. Cl. ...................... 442/381; 442/400; 442/409; 442/387; 442/388; 442/393; 442/417; 264/113

(58) Field of Classification Search ................ 442/381, 442/400, 409, 387, 388, 393, 417; 264/113
See application file for complete search history.

(56) References Cited

U.S. PATENT DOCUMENTS

| | | | | | |
|---|---|---|---|---|---|
| 4,766,029 | A | | 8/1988 | Brock et al. | |
| 4,863,785 | A | * | 9/1989 | Berman et al. | 428/218 |
| 4,900,619 | A | | 2/1990 | Ostrowski et al. | |
| 5,169,700 | A | | 12/1992 | Meier et al. | |
| 5,169,712 | A | | 12/1992 | Tapp | |
| 5,213,881 | A | | 5/1993 | Timmons et al. | |
| 5,298,694 | A | * | 3/1994 | Thompson et al. | 181/286 |
| 5,459,291 | A | | 10/1995 | Haines et al. | |
| 5,466,516 | A | * | 11/1995 | Lutzow et al. | 428/198 |
| 5,584,950 | A | * | 12/1996 | Gaffigan | 156/71 |
| 5,714,067 | A | * | 2/1998 | Sorrick | 210/490 |
| 5,759,659 | A | | 6/1998 | Sanocki et al. | |
| 5,773,375 | A | | 6/1998 | Swan et al. | |
| 5,804,512 | A | * | 9/1998 | Lickfield et al. | 442/346 |
| 5,886,306 | A | | 3/1999 | Patel et al. | |
| 6,220,388 | B1 | | 4/2001 | Sanborn | |
| 6,358,592 | B2 | | 3/2002 | Vair, Jr. et al. | |

FOREIGN PATENT DOCUMENTS

| | | |
|---|---|---|
| DE | 4126884 | 2/1993 |
| DE | 4207243 | 9/1993 |
| JP | 10203268 | 8/1998 |
| JP | 10331288 | 12/1998 |
| WO | WO 99/44817 | 9/1999 |

OTHER PUBLICATIONS

Seminar: Ban-und Dammstoffe aus Hanf: Technik, Sep. 12, 1998 in Bremen, Eignung unterschiedlicher biogener Fasern fur die Warmedammung.

* cited by examiner

*Primary Examiner*—Norca L Torres-Velazquez
(74) *Attorney, Agent, or Firm*—Margaret S. Millikin

(57) ABSTRACT

A fibrous blanket material is provided having a first fibrous layer selected from a group of fibers consisting of polyester, polypropylene, polyethylene, fiberglass, natural fibers, nylon, rayon and blends thereof and a layer of meltblown polypropylene fibers. In an alternative embodiment the blanket may also include a second fibrous layer made of the same material as the first layer where the layer of meltblown polypropylene fibers is sandwiched between the two fibrous layers.

9 Claims, 3 Drawing Sheets

LOW POROSITY FACINGS FOR ACOUSTIC APPLICATIONS

TECHNICAL FIELD AND INDUSTRIAL APPLICABILITY OF THE INVENTION

The present invention relates generally to the field of insulation products and, more particularly, to a fibrous blanket material and the method of making the same where the acoustical characteristics of the material may be tuned to meet the needs of a particular application.

BACKGROUND OF THE INVENTION

Fibrous blanket materials of various polymers including but not limited to polyester, polypropylene, polyethylene, nylon and rayon, as well as natural fibers and fiberglass are known to be useful for a number of purposes. Exemplary of the many applications for these materials are office screens and partitions, ceiling tiles, building panels and various vehicle applications including use as hood liners, head liners, floor liners and trim panels.

U.S. Pat. No. 5,886,306 to Patel et al., U.S. Pat. No. 6,358,592 to Vair, Jr. et al. and U.S. Pat. No. 4,766,029 to Brock et al. are representative of the state of the art. The Patel et al. patent relates to a layered acoustical insulating web comprising a series of cellulose fiber layers sandwiched between a layer of melt-blown or spunbond thermoplastic fibers such as polypropylene and a layer of film, foil, paper or spunbond thermoplastic fibers.

The Vair, Jr. et al. patent relates to a melt-blown fibrous insulation including a fibrous layer of randomly oriented, air laid, thermoplastic fibers and two thin integral skins. The skins include fine holes or openings that exhibit a significant airflow resistivity that not only reflect sound waves but also function as an airflow resistance barrier that enhances sound absorption properties.

The Brock et al. patent relates to a semi-permeable nonwoven laminate that incorporates polypropylene and polyethylene sandwiched between two spunbond layers of polypropylene.

SUMMARY OF THE INVENTION

In accordance with the purposes of the present invention as described herein, a fibrous blanket material is provided. That fibrous blanket material comprises a first fibrous layer selected from a group of fibers consisting of polyester, polypropylene, polyethylene, fiberglass, natural fibers, nylon, rayon and blends thereof and a layer of melt-blown polypropylene fibers. The first fibrous layer has a thickness of between about 0.5 and about 8.0 cm. The first fibrous layer also has an average fiber diameter of between about 10.0 and about 30.0 microns and a density of between about 0.5 and about 8.0 lbs/ft$^3$.

The layer of meltblown polypropylene fibers has a thickness of between about 0.0127 to about 0.254 cm. The layer of meltblown polypropylene fibers also has a weight of between about 0.5 to about 10.0 ounces/sq. yard and more typically of between about 0.5 to about 3.0 ounces/sq. yard. The meltblown polypropylene fibers have an average diameter of between about 2.5 to about 50.0 microns and more typically between about 5.0 to about 25.0 microns.

The fibrous blanket material of the present invention may also include a second fibrous layer selected from a group of fibers consisting of polyester, polypropylene, polyethylene, fiberglass, natural fibers, nylon, rayon and blends thereof, wherein the layer of meltblown polypropylene fibers is sandwiched between the first and second fibrous layers.

In this, second embodiment the first layer has a thickness of between about 0.5 and about 5.0 cm, the layer of meltblown polypropylene fibers has a thickness of between about 0.0127 and about 0.254 cm and the second fibrous layer has a thickness of between about 0.5 and about 5.0 cm. The layer of meltblown polypropylene fibers has a weight of between about 0.5 to about 10.0 ounces/sq. yard and more typically between about 0.5 to about 3.0 ounces/sq. yard. The meltblown polypropylene fibers have an average diameter of between about 2.5 to about 50.0 microns and more typically between about 5.0 and about 25.0 microns.

In accordance with yet another aspect of the present invention, a method of making a fibrous blanket material is provided. That method includes the steps of forming a first fibrous layer selected from a group of fibers consisting of polyester, polypropylene, polyethylene, fiberglass, natural fibers, nylon, rayon and blends thereof and adding a layer of meltblown polypropylene fibers to the first fibrous layer.

The method may further include the steps of forming a second fibrous layer selected from a group of fibers consisting of polyester, polypropylene, polyethylene, fiberglass, natural fibers, nylon, rayon and blends thereof and sandwiching the layer of meltblown polypropylene fibers between the first and second fibrous layers.

Still further, the method may include the tuning of the acoustical properties of the fibrous blanket material by manipulating one or more of the following: (a) the average diameter of the meltblown polypropylene fibers; (b) the weight of the layer of meltblown polypropylene fibers; (c) the thickness of the second layer of meltblown polypropylene fibers; and (d) the thickness of the first and second fibrous layers sandwiching the layer of meltblown polypropylene fibers.

In the following description there is shown and described multiple embodiments of this invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of this specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
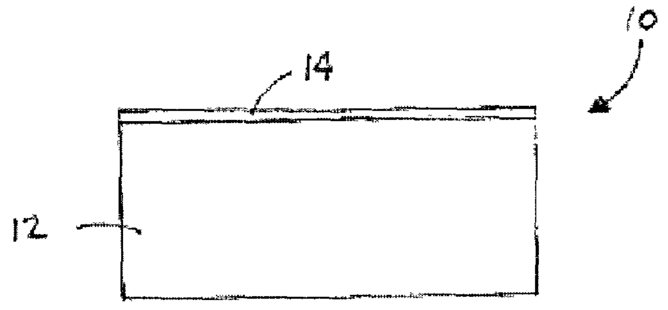
FIG. 1 is a schematical end elevational representation of a two layer embodiment of the fibrous blanket material of the present invention.

Reference is now made to FIG. 1 showing a fibrous blanket material 10 of the present invention. The fibrous blanket material 10 may be utilized for a number of applications including but not limited to use in office screens and partitions, ceiling tiles, building panel, as well as use in vehicles including as hood liners, head liners, floor liners, trim panels and the like. While sound attenuation is a common goal in these various applications, it should be appreciated that the sounds requiring attenuation in each of these applications differ in both amplitude and frequency. Advantageously, it is possible to tune the acoustical properties or characteristics of the fibrous blanket material of the present invention to provide the best possible sound attenuating performance for a particular product application.

The FIG. 1 embodiment of the fibrous blanket material 10 includes a first fibrous layer that is selected from a group of fibers consisting of polyester (e.g. polyethylene terephthalate), polypropylene, polyethylene, fiberglass, natural fibers (e.g. hemp, kenaf, cotton), nylon, rayon and blends thereof. Additionally, the fibrous blanket material 10 includes a layer 14 of meltblown polypropylene fibers.

The first fibrous layer 12 typically is provided with a thickness of between about 0.5 and about 8.0 cm. The first fibrous layer has an average fiber diameter of between about 10.0 and about 30.0 microns and a density of between about 0.5 and about 8.0 lbs/ft$^3$.

The layer 14 of meltblown polypropylene fibers has a thickness of between about 0.0127 to about 0.254 cm. The layer 14 of meltblown polypropylene fibers has a weight of between about 0.5 to about 10.0 ounces/sq. yard and more typically of between about 0.5 to about 3.0 ounces/sq. yard. The meltblown polypropylene fibers of the layer 14 have an average diameter of between about 2.5 to about 50.0 microns and more typically from about 5.0 to about 25.0 microns.

Figure 2:
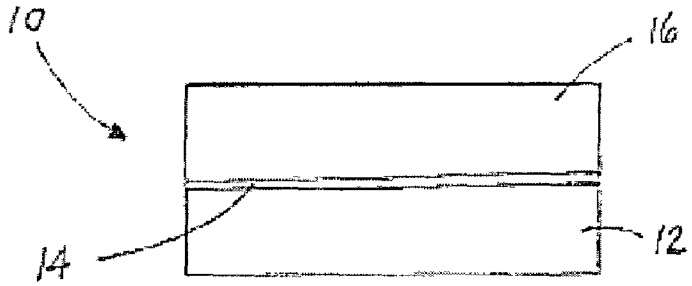
FIG. 2 is a schematical end elevational representation of one possible three layer embodiment of the present invention.
Figure 3:
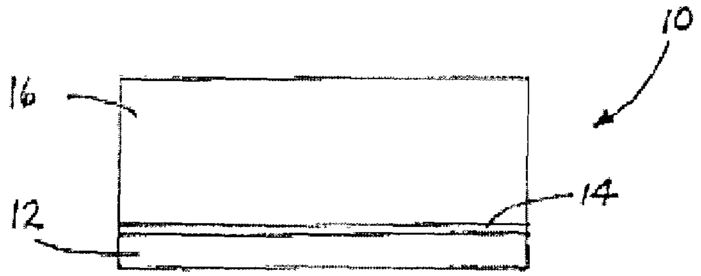
FIG. 3 is a schematical end elevational representation of another possible three layer embodiment of the present invention.

Two alternative embodiments of the present invention are shown in FIGS. 2 and 3. In the FIGS. 2 and 3 embodiments, the fibrous blanket material 10 includes a first fibrous layer 12, a layer of meltblown polypropylene fibers 14 and a second fibrous layer 16. The only difference between the two embodiments is that in the FIG. 2 embodiment the layer of meltblown polypropylene fibers 14 is positioned between first and third fibrous layers 12, 16 of substantially equal thickness whereas in the FIG. 3 embodiment, the first fibrous layer 12 is substantially thicker (i.e. three or more times) than the second fibrous layer 16.

The first and second fibrous layers are selected from a group of fiber materials consisting of polyester (e.g. polyethylene terephthalate), polypropylene, polyethylene, fiberglass, natural fibers (e.g. hemp, kenaf, cotton), nylon, rayon and blends thereof. The first and second layers 12, 16 have a thickness of between about 0.5 and about 5.0 cm. The layer of meltblown polypropylene fibers has a thickness of between about 0.0127 and about 0.254 cm. The average fiber diameter of the fibers in the first and second layers 12, 16 is between about 10.0 and about 30.0 microns. The density of the first and second layers 12, 16 is between about 0.5 and about 8.0 lbs/ft$^3$.

As disclosed in the first embodiment in FIG. 1, the layer 14 of the embodiment shown in FIGS. 2 and 3 comprises meltblown polypropylene fibers having a weight of between about 0.5 to about 10.0 ounces/sq. yard and more typically between about 0.5 to about 3.0 ounces/sq. yard. The meltblown polypropylene fibers of the layer have an average diameter of between about 2.5 to about 50.0 microns and more typically of between about 5.0 to about 25.0 microns.

The method of the present invention for making a fibrous blanket material 10 may be broadly described as including the steps of forming a first fibrous layer selected from a group of fibers consisting of polyester, polypropylene, polyethylene, fiberglass, natural fibers, nylon, rayon and blends thereof, forming a layer of meltblown polypropylene fibers and adding said second layer of meltblown polypropylene fibers to said first fibrous layer. More specifically, the layers 12 and 14 are formed independently by any suitable manner known in the art. The first fibrous layer 12 may incorporate multicomponent fibers, powder resin or other chemicals to promote bonding. Alternatively, bonding may be achieved by mechanical means such as needling. The two layers 12, 14 are then joined together by heating sufficiently to cause the two layers to bond together along their interface and/or by application of a spray adhesive such as a spray hot melt known to be useful in binding fibers of the type utilized in the layers 12, 14 of the invention. This set of steps provides the fibrous blanket material embodiment shown in FIG. 1.

Of course it should be further appreciated that the method may include the steps of forming a second fibrous layer selected from a group of fibers consisting of polyester, polypropylene, polyethylene, fiberglass, natural fibers, nylon, rayon and blends thereof and sandwiching the layer of meltblown polypropylene fibers between the first and second fibrous layers. The second fibrous layer 16 may be formed from the same materials and in accordance with the same procedure as the first fibrous layer 12. Similarly, the layers 14, 16 are bond together in the same manner as the layers 12, 14 to provide a laminated final product. This set of steps provides the embodiments of the fibrous blanket material shown in FIGS. 2 and 3.

In accordance with a unique aspect of the present invention, various aspects of the method may be varied in order to tune the acoustical properties of the resulting fibrous blanket material 10. Thus, the method also includes the steps of tuning acoustical properties by manipulating one or more of the following: (a) the average diameter of the meltblown polypropylene fibers; (b) the weight of the layer of meltblown polypropylene fibers; (c) the thickness of the layer of meltblown polypropylene fibers; and (d) the thickness of the first and second fibrous layers sandwiching the layer of meltblown polypropylene fibers. Generally, when smaller fiber diameters are utilized, thinner layer thicknesses and weights are chosen to provide the best overall acoustical results.

Figure 4:
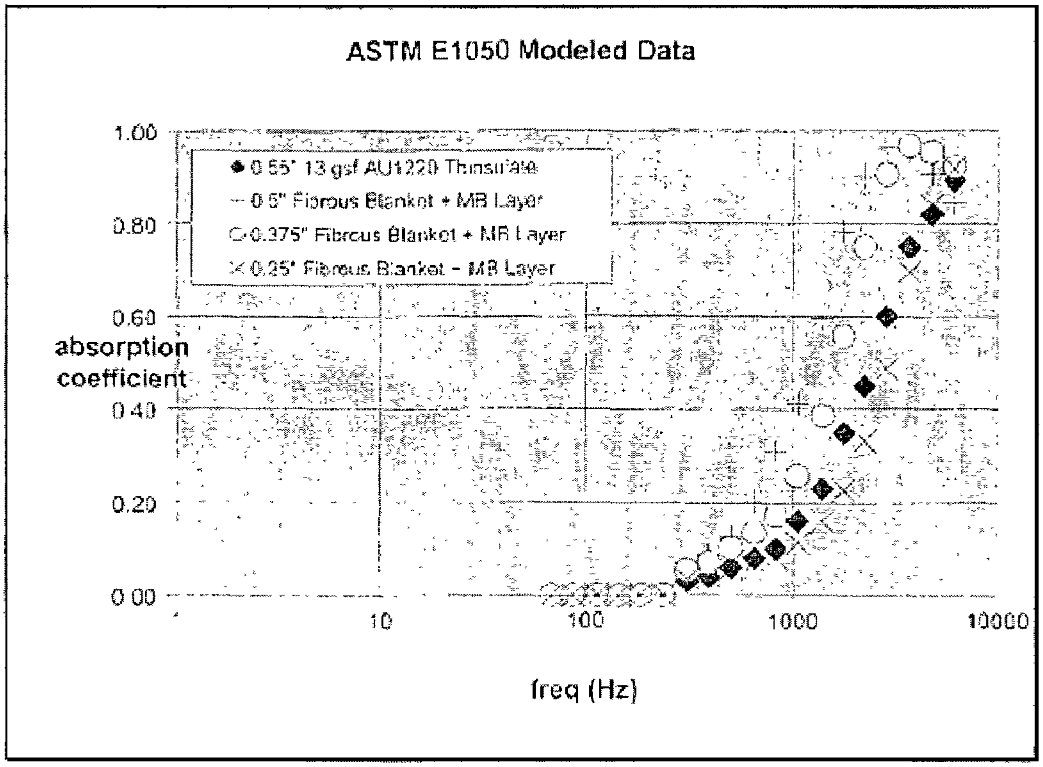
FIG. 4 is a graphical illustration of ASTM E1050 modeled data for three different two layer embodiments of the present invention and a state of the art 0.55 inch 13 gsf AU1220 Thinsulate material.
Figure 5:
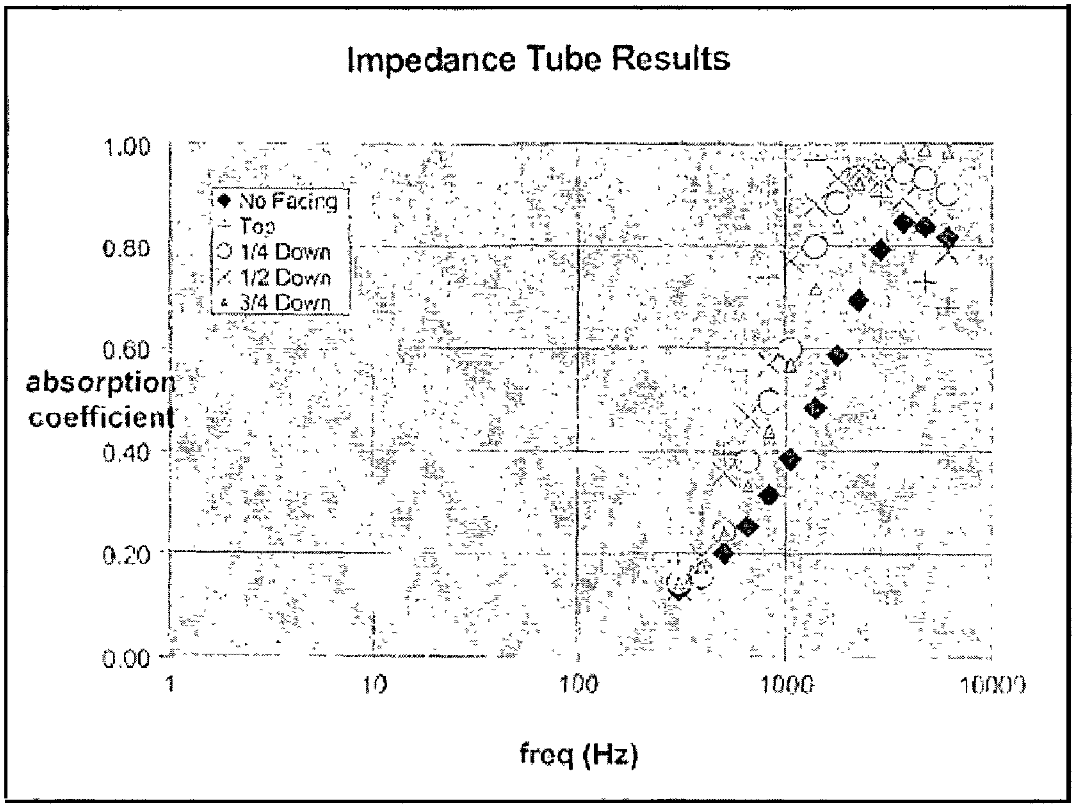
FIG. 5 is a graphical representation of impedance tube results illustrating how the acoustical properties of the fibrous blanket material of the present invention may be tuned by repositioning the layer of meltblown polypropylene fibers at different positions within the overall fibrous blanket construction.

In order to further illustrate the present invention, reference is made to FIGS. 4 and 5. FIG. 4 shows ASTM E1050 modeled data for three different two layer specimens of the present invention as shown in the legend to FIG. 4. Each of the specimens includes a layer 14 of meltblown polypropylene fibers of 0.05 cm thickness with a weight of 1.5 osy (ounces per square yard) and an average fiber diameter of 18 microns versus a state of the art 0.55 inch thick 13 gsf AU1220 Thinsulate material. Both the ⅜ inch and ½ inch fibrous layer materials with the meltblown layer provides superior acoustical insulation properties over a frequency range of approximately 500 to 7500 Hz when compared to the state of the art Thinsulate product. Advantageously, this enhanced performance is achieved at a substantially 15% lower cost.

FIG. 5 discloses impedance tube results to demonstrate how the acoustical properties of the fibrous blanket material 10 of the present invention may be changed/tuned by repositioning the second layer 14 of meltblown polypropylene fibers at different positions within an overall fibrous blanket construction of constant thickness: that is, between first and second fibrous layers 12, 16 of differing thicknesses. More specifically, the results are for a fibrous blanket material incorporating a layer 14 of meltblown polypropylene fibers having a thickness of approximately 0.05 cm. In a first specimen, the layer 14 of meltblown polypropylene fibers are provided on top of a first fibrous layer 12 having a thickness of approximately 2.5 cm. In a second specimen the layer 14 of meltblown polypropylene fibers is provided between a first fibrous layer 12 of approximately 1.9 cm thickness and a second fibrous layer 16 of approximately 0.6 cm thickness. In a third specimen the layer 14 of meltblown polypropylene fibers is provided between two fibrous layers 12, 16 each having a thickness of approximately 1.25 cm. In a fourth specimen the layer 14 of meltblown polypropylene fibers is provided between a first lower fibrous layer 12 of approximately 0.6 cm thickness and a second or upper fibrous layer 16 of approximately 1.9 cm thickness. The last specimen is a fibrous blanket layer without a second layer of meltblown polypropylene fibers for baseline comparison. The data clearly show how the material can be tuned to provide the best possible absorption coefficient for a particular frequency. This will allow the material 10 of the present invention to be matched to a particular application and thereby provide superior acoustical insulation performance for any particular application.

In summary, the present invention utilizes the benefits of a thin layer 14 of meltblown polypropylene fibers to boost the acoustical properties of a fibrous blanket material 10. The porosity achieved in thin, lightweight meltblown layers is ideally suited for improving acoustical performance. While the invention will generally utilize the meltblown layer 14 on the top or bottom surface of a fibrous layer 12, the meltblown polypropylene fiber layer may also be placed between lower and upper fibrous layers 12, 16 for a material of given thickness. This repositioning or alternate placement of the meltblown layer 14 in the fibrous layers 12, 16 can be utilized to shift the acoustical curve in order to achieve specific acoustical targets. Thus, material 10 may be tuned to provide enhanced performance for any particular application.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A fibrous blanket material, comprising:

a first fibrous layer selected from a group of fibers consisting of polyester, polypropylene, polyethylene, fiberglass, natural fibers, nylon, rayon and blends thereof wherein said fibers have an average diameter of between about 10.0 and about 30.0 microns and a thickness of between about 0.5 and about 8.0 cm; and a layer of meltblown polypropylene fibers having a thickness of between about 0.0127 to about 0.254 cm wherein said first fibrous layer and said layer of meltblown polypropylene fibers are bonded together by means of heat, spray adhesive or both.

2. A fibrous blanket material, comprising:

a first fibrous layer selected from a group of fibers consisting of polyester, polypropylene, polyethylene, fiberglass, natural fibers, nylon, rayon and blends thereof wherein said fibers have an average diameter of between about 10.0 and about 30.0 microns and a density of between about 0.5 and about 8.0 lbs/ft$^3$; and a layer of meltblown polypropylene fibers having a thickness of between about 0.0127 to about 0.254 cm wherein said first fibrous layer and said layer of meltblown polypropylene fibers are bonded together by means of heat, spray adhesive or both.

3. A fibrous blanket material, comprising:

a first fibrous layer selected from a group of fibers consisting of polyester, polypropylene, polyethylene, fiberglass, natural fibers, nylon, rayon and blends thereof wherein said fibers have an average diameter of between about 10.0 and about 30.0 microns;

a layer of meltblown polypropylene fibers; and a second fibrous layer selected from a group of fibers consisting of polyester, polypropylene, polyethylene, fiberglass, natural fibers, nylon, rayon and blends thereof, wherein said layer of meltblown polypropylene fibers is sandwiched between said first and second fibrous layers wherein said first fibrous layer, said layer of meltblown polypropylene fibers and said second fibrous layer are bonded together by heat, spray adhesive or both;

said first fibrous layer having a thickness of between about 0.5 and about 5.0 cm, said layer of meltblown polypropylene fibers having a thickness of between about 0.0127 and about 0.254 cm and said second fibrous layer having a thickness of between about 0.5 and about 5.0 cm.

4. The fibrous blanket material of claim 3, wherein said layer of meltblown polypropylene fibers has a weight of between about 0.5 to about 10.0 ounces/sq. yard.

5. The fibrous blanket material of claim 3, wherein said layer of meltblown polypropylene fibers has a weight of between about 0.5 to about 3.0 ounces/sq. yard.

6. The fibrous blanket material of claim 3, wherein said meltblown polypropylene fibers have an average diameter of between about 2.5 to about 50.0 microns.

7. The fibrous blanket material of claim 3, wherein said meltblown polypropylene fibers have an average diameter of between about 5.0 to about 25.0 microns.

8. A fibrous blanket material, comprising:

a first fibrous layer selected from a group of fibers consisting of polyester, polypropylene, polyethylene, fiberglass, natural fibers, nylon, rayon and blends thereof having an average fiber diameter of between about 10.0 and about 30.0 microns, a density of between about 0.5 and about 8.0 lbs/ft$^3$ and a thickness of between about 0.5 and about 8.0 cm; and a layer of meltblown polypropylene fibers having a thickness of between about 0.0127 to about 0.254 cm, an average fiber diameter of between about 2.5 to about 50.0 microns and a weight of between about 0.5 to about 10.0 ounces/sq. yard wherein said first fibrous layer and said layer of meltblown polypropylene fibers are bonded together by means of heat, spray adhesive or both.

9. A fibrous blanket material, comprising:

a first fibrous layer selected from a group of fibers consisting of polyester, polypropylene, polyethylene, fiberglass, natural fibers, nylon, rayon and blends thereof;

a layer of meltblown polypropylene fibers having an average fiber diameter of between about 2.5 to about 50.0 microns and a weight of between about 0.5 to about 10.0 ounces/sq. yard; and a second fibrous layer selected from a group of fibers consisting of polyester, polypropylene, polyethylene, fiberglass, natural fibers, nylon, rayon and blends thereof, wherein said layer of meltblown polypropylene fibers is sandwiched between said first and second fibrous layers wherein said first fibrous layer, said layer of meltblown polypropylene fibers and said second fibrous layer are bonded together by heat, spray adhesive or both;

said first fibrous layer having a thickness of between about 0.5 and about 5.0 cm, said layer of meltblown polypropylene fibers having a thickness of between about 0.0127 and about 0.254 cm and said second fibrous layer having a thickness of between about 0.5 and about 5.0 cm.

* * * * *